United States Patent
Dobashi (10) Patent No.: US 12,017,233 B2
(45) Date of Patent: Jun. 25, 2024

(54) NOZZLE STRUCTURE, BLOWING DEVICE, AND METHOD FOR PRODUCING COMPONENTS, BEARINGS, DIRECT-ACTING DEVICES, STEERING DEVICES AND VEHICLES

(71) Applicant: NSK LTD., Tokyo (JP)

(72) Inventor: Kouhei Dobashi, Fujisawa (JP)

(73) Assignee: NSK LTD., Tokyo (JP)

( * ) Notice: Subject to any disclaimer, the term of this patent is extended or adjusted under 35 U.S.C. 154(b) by 549 days.

(21) Appl. No.: 16/647,735

(22) PCT Filed: Jul. 18, 2018

(86) PCT No.: PCT/JP2018/026980
§ 371 (c)(1),
(2) Date: Mar. 16, 2020

(87) PCT Pub. No.: WO2019/082456
PCT Pub. Date: May 2, 2019

(65) Prior Publication Data
US 2020/0230624 A1 Jul. 23, 2020

(30) Foreign Application Priority Data
Oct. 24, 2017 (JP) .................. 2017-205266

(51) Int. Cl.
*B05B 1/02* (2006.01)
*B08B 3/04* (2006.01)
(Continued)

(52) U.S. Cl.
CPC .................. *B05B 1/02* (2013.01); *B08B 3/04* (2013.01); *B05B 1/14* (2013.01); *B08B 3/02* (2013.01);
(Continued)

(58) Field of Classification Search
None
See application file for complete search history.

(56) References Cited

U.S. PATENT DOCUMENTS 6,079,429 A * 6/2000 Zarich .................... B44D 3/006
134/182
6,694,991 B1 2/2004 Mizuno et al.
(Continued)

FOREIGN PATENT DOCUMENTS

GB 570318 A 7/1945
JP 54-40488 A 3/1979
(Continued)

OTHER PUBLICATIONS

Search Report (PCT/ISA/210) dated Oct. 16, 2018, issued by the International Searching Authority in counterpart International Patent Application No. PCT/JP2018/026980.
(Continued)

*Primary Examiner* — Cristi J Tate-Sims
(74) *Attorney, Agent, or Firm* — Sughrue Mion, PLLC (57) ABSTRACT

Provided is a nozzle structure, a blow device, and a manufacturing method for parts, a bearing, a linear motion device, a steering device, a vehicle, and a mechanical device which can uniformly and satisfactorily perform various processes with fluid over a wide range on a processing target member. The nozzle structure includes an inner member, an outer member surrounding the inner member, and a laminar flow path formed between an outer surface of the inner member and an inner surface of the outer member to allow fluid to flow. The blow device or the mechanical device having the nozzle structure can process the inner member by flowing the fluid in the flow path.

16 Claims, 5 Drawing Sheets

(51) Int. Cl.
  *B05B 1/14* (2006.01)
  *B08B 3/02* (2006.01)
  *B08B 5/00* (2006.01)
  *F26B 21/00* (2006.01)

(52) U.S. Cl.
  CPC ............. *B08B 5/00* (2013.01); *F16C 2235/00* (2013.01); *F26B 21/004* (2013.01)

(56) References Cited

U.S. PATENT DOCUMENTS

| | | |
|---|---|---|
| 2004/0168704 A1 | 9/2004 | Mizuno et al. |
| 2007/0262170 A1 | 11/2007 | Nolte et al. |

FOREIGN PATENT DOCUMENTS

| | | |
|---|---|---|
| JP | 2001-59680 A | 3/2001 |
| JP | 2001-129497 A | 5/2001 |
| JP | 3399903 B2 | 2/2003 |
| JP | 2008-174246 A | 7/2008 |
| JP | 2009-144974 A | 7/2009 |
| JP | 2009-214050 A | 9/2009 |
| JP | 2010-91176 A | 4/2010 |
| KR | 1020140069844 A | 6/2014 |
| WO | 8301747 A1 | 5/1983 |
| WO | 9218260 A1 | 10/1992 |
| WO | WO-9218260 A1 * | 10/1992 ............. B05B 1/005 |

OTHER PUBLICATIONS

Written Opinion (PCT/ISA/237) dated Oct. 16, 2018, issued by the International Searching Authority in counterpart International Patent Application No. PCT/JP2018/026980.

Communication dated Nov. 10, 2020 from the European Patent Office in European application No. 18870061.1.

* cited by examiner

NOZZLE STRUCTURE, BLOWING DEVICE, AND METHOD FOR PRODUCING COMPONENTS, BEARINGS, DIRECT-ACTING DEVICES, STEERING DEVICES AND VEHICLES

This application is a National Stage of International Application No. PCT/JP2018/026980 filed Jul. 18, 2018 that claims priority from Japanese Application No. 2017-205266, filed Oct. 24, 2017, and the disclosures of which are incorporated herein in their entirety by reference.

TECHNICAL FIELD

The present invention relates to a nozzle structure, a blow device, and a manufacturing method for parts, a bearing, a linear motion device, a steering device, a vehicle, and a mechanical device.

BACKGROUND ART

For example, in order to remove cleaning liquid, dust, powder, or the like adhering to a surface of a member which is a workpiece formed by machining or the like, a blow process of blowing air to an outer surface of the member is performed. As the blow process, there is a process in which dry air sent into a casing through which a film is passed flows out from a slit through which the film is passed (see Patent Document 1, for example). A technique in which air fluid is blown onto a product by a discharge nozzle and suction is performed by a suction nozzle is also known (see Patent Document 2, for example). Furthermore, a technique in which compressed air is blown from an annular gas outlet onto an outer peripheral surface of the resin-coated electric wire to drain water from a resin-coated electric wire is also known (see Patent Document 3, for example).

PRIOR ART DOCUMENT

Patent Document

Patent Document 1: JP-A-2009-144974
Patent Document 2: JP-A-2001-59680
Patent Document 3: Japanese Patent No. 3399903

SUMMARY OF INVENTION

Technical Problem

The blow process as described above is widely used because the mechanism is simple and inexpensive. However, when a shape of a member to be processed is complicated, a portion which cannot be subjected to removing above matters remains on the surface of the member. Therefore, it is conceivable to blow air from a large number of nozzles. In this case, the amount of air consumption increases and adjustment of the air blowing becomes difficult. As a result, processing on the member becomes unstable, and thus uniform and wide-range processing becomes difficult. Further, when air is simply blown onto the surface of the member, turbulent flow is generated around a blown portion, which may cause a reduction in processing capability and reattachment of the removed object.

The invention is made in view of the situation described above and an object thereof is to provide a nozzle structure, a blow device, and a manufacturing method for parts, a bearing, a linear motion device, a steering device, a vehicle, and a mechanical device which can uniformly and satisfactorily perform various processes with fluid on a processing target member.

Solution to Problem

The invention has the following configuration.

(1) A nozzle structure including an inner member, an outer member surrounding the inner member, and a laminar flow path formed between an outer surface of the inner member and an inner surface of the outer member to allow fluid to flow.

According to the nozzle structure, instead of spraying the fluid on the outer surface of the inner member to be processed, the fluid flows in the laminar flow path between the inner member and the outer member. Therefore, a continuous high-speed laminar flow with no unevenness in almost the entire area near the surface of the inner member can be generated uniformly without reducing a flow rate, and thus various processes can be efficiently favorably performed with a small amount of fluid on the inner member.

As various processes, for example, a removal process for removing liquid, dust, powder, or the like adhering to the outer surface of the inner member, a cleaning process for cleaning the outer surface of the inner member, a drying process for drying the outer surface of the inner member, a cooling process for cooling the inner member with a fluid, and the like are exemplified.

(2) The nozzle structure according to (1) further including a fluid inlet which communicates with the flow path and through which the fluid flows into the flow path and a fluid outlet through which the fluid fed from the fluid inlet and passing through the flow path flows out.

According to the nozzle structure, various processes using the fluid can be satisfactorily performed on the inner member by the fluid fed from the fluid inlet, passing through the laminar flow path, and flowing out from the fluid outlet.

(3) The nozzle structure according to (1) or (2), in which the inner member is subjected to a process by the fluid flowing through the laminar flow path along the outer surface of the inner member.

According to the nozzle structure, it is possible to efficiently perform various processes by the fluid for the inner member by causing the fluid to flow in a laminar manner along the outer surface of the inner member rather than spraying the fluid to the inner member.

(4) The nozzle structure according to any one of (1) to (3), in which the inner member has unevenness on the outer surface, and the flow path is formed along the unevenness of the outer surface of the inner member.

According to the nozzle structure, the fluid flows through the laminar flow path formed along the unevenness of the outer surface of the inner member. Thereby, various processes using the fluid can be efficiently performed on the inner member having a complicated shape having unevenness on the outer surface.

(5) The nozzle structure according to any one of (1) to (4), in which the flow path has a cross-sectional area changed along a flow direction of the fluid.

According to the nozzle structure, the flow rate of the fluid flowing through the flow path is partially changed by changing the cross-sectional area. Thereby, the change of the flow rate of the fluid can partially give strength to the processes by the fluid for the inner member, and thus it is possible to satisfactorily perform uniform processing, partial concentration processing, and processing on a part of complex and complicated shapes.

(6) The nozzle structure according to any one of (1) to (5), in which the fluid flowing through the flow path is spirally flown along the outer surface of the inner member.

According to the nozzle structure, it is possible to satisfactorily perform various processes with the fluid for the inner member by the fluid flowing spirally along the outer surface of the inner member. In particular, even when the inner member has an outer surface with a non-uniform complicated shape from the inlet to the outlet of the fluid, various processes can be performed satisfactorily by flowing the fluid uniformly over the outer surface with the complicated shape.

(7) The nozzle structure according to any one of (1) to (6), in which the flow path is narrower in a radial direction toward an outer peripheral side of the inner member.

According to the nozzle structure, the cross-sectional area of the flow path in an axial vertical section can be made constant by narrowing a radial gap of the flow path toward the outer peripheral side of the inner member where the diameter increases.

(8) The nozzle structure according to any one of (1) to (7), in which the outer member has a divided structure having a plurality of divided bodies.

According to the nozzle structure, it can be widely adapted to the shape of the inner member and the surrounding situation of the equipment.

(9) A blow device which performs a process on the inner member by flowing the fluid in the flow path in the nozzle structure according to any one of (1) to (8).

According to the blow device, for example, various processes such as a removal process for removing liquid, dust, powder, or the like adhering to the outer surface of the inner member, a cleaning process for cleaning the outer surface of the inner member, a drying process for drying the outer surface of the inner member, and a cooling process for cooling the inner member with a fluid can be satisfactorily performed.

(10) A manufacturing method for parts which includes a processing step of processing the inner member by flowing the fluid in the flow path in the nozzle structure according to any one of (1) to (8).

According the manufacturing method for parts, a high-quality member made of the inner member on which, for example, various processes such as a removal process for removing liquid, dust, powder, or the like adhering to the outer surface, a cleaning process for cleaning the outer surface, a drying process for drying the outer surface, and a cooling process for cooling with a fluid are satisfactorily performed can be manufactured.

(11) A manufacturing method for a bearing which uses the manufacturing method for parts according to (10).

(12) A manufacturing method for a linear motion device which uses the manufacturing method for parts according to (10).

(13) A manufacturing method for a steering device which uses the manufacturing method for parts according to (10).

(14) A manufacturing method for a vehicle which uses the manufacturing method for parts according to (10).

(15) A manufacturing method for a mechanical device which uses the manufacturing method for parts according to (10).

According to those manufacturing methods, components of bearings, linear motion devices, steering devices, vehicles, and mechanical devices can be manufactured with high quality.

Advantageous Effects of Invention

According to the invention, it is possible to uniformly and satisfactorily perform various processes using a fluid on a processing target member over a wide range.

DESCRIPTION OF EMBODIMENTS

Figure 1:
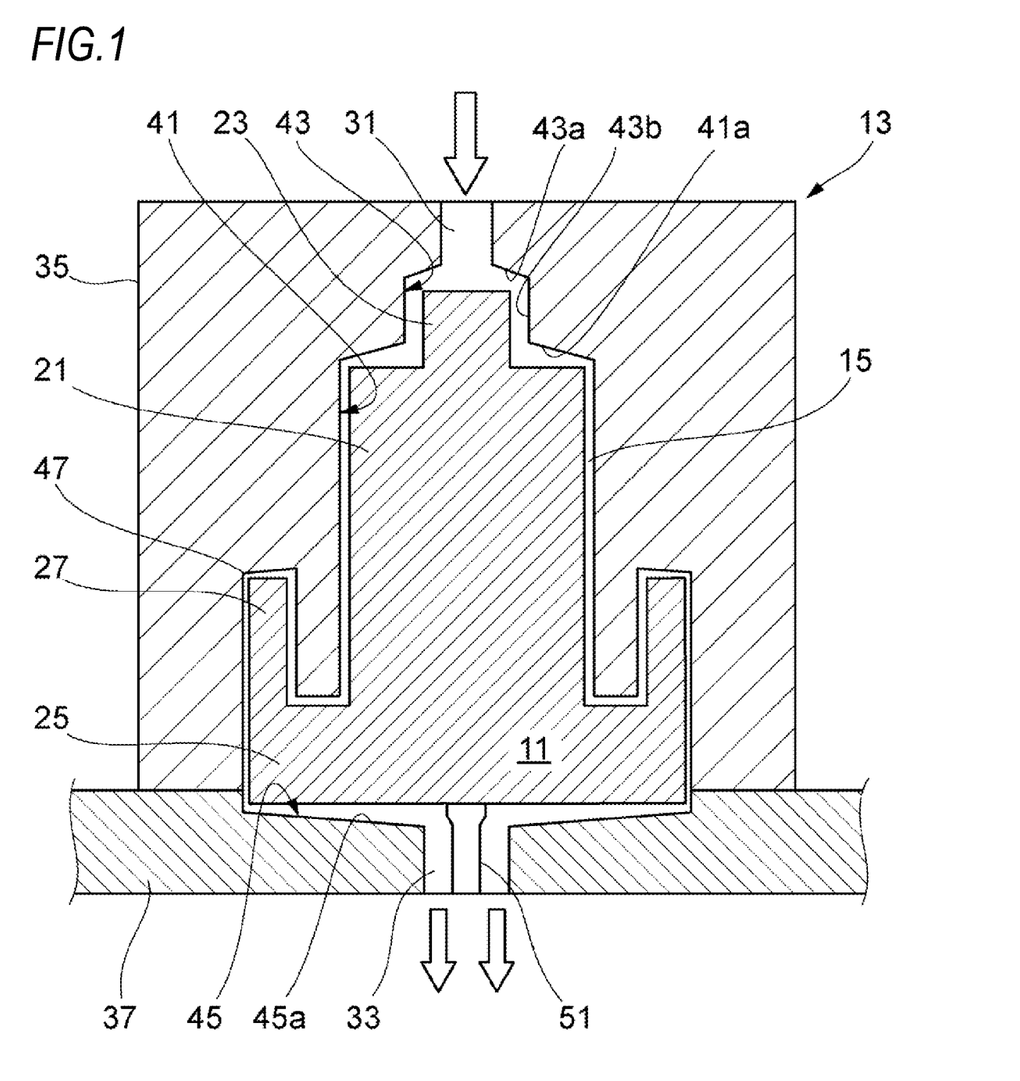
FIG. 1 is a cross-sectional view illustrating a nozzle structure according to a first embodiment.

Hereinafter, embodiments of the invention will be described in detail with reference to the drawings. FIG. 1 is a cross-sectional view illustrating a nozzle structure according to a first embodiment.

First Embodiment

The nozzle structure of the first embodiment includes an inner member 11, an outer member 13, and a flow path 15. This nozzle structure constitutes a blow device which performs various processes on the inner member 11.

The inner member 11 includes a main body portion 21 formed in a columnar shape, a protrusion portion 23 of a small-diameter columnar shape provided on an end surface of one end (upper end of FIG. 1) of the main body portion 21A, and a flange portion 25 provided at the other end (lower end in FIG. 1) of the main body portion 21 and projecting outward in a radial direction. A cylindrical portion 27 extending along the main body portion 21 toward the one end side of the main body portion 21 is formed on an outer edge of the flange portion 25.

The outer member 13 has a fluid inlet 31 on one end side and a fluid outlet 33 on the other end side. The outer member 13 has an outer main body portion 35 and an outer bottom plate portion 37. The outer member 13 is configured by abutting the outer main body portion 35 and the outer bottom plate portion 37 with each other in an axial direction.

The outer member 13 has a main body accommodating recess portion 41 which accommodates the main body portion 21 of the inner member 11. On the inner wall surface on one end side of the main body accommodating recess portion 41, a protrusion accommodating recess portion 43 for accommodating the protrusion portion 23 of the inner member 11 is formed. Further, a flange accommodating recess portion 45 for accommodating the flange portion 25 of the inner member 11 is formed in an opening on the other end side of the main body accommodating recess portion 41. A cylindrical recess portion 47 for accommodating the cylindrical portion 27 of the inner member 11 is formed on the outer edge of the flange accommodating recess portion 45.

The fluid inlet 31 communicates with an inner opening in an inner end surface 43a of an annular shape formed on one end side of the protrusion accommodating recess portion 43. A cylindrical inner wall surface 43b of the protrusion accommodating recess portion 43 is formed to have a larger diameter than that of the protrusion portion 23 of the inner member 11. An inner end surface 41a of the main body accommodating recess portion 41 is formed to have a larger diameter than that of the main body portion 21 of the inner member 11 and a larger diameter than that of the inner wall surface 43b. The inner end surfaces 41a and 43a are both tapered so that the diameter gradually increases from the fluid inlet 31 toward the main body accommodating recess portion 41.

The fluid outlet 33 communicates with an inner opening in an inner end surface 45a of an annular shape formed in the flange accommodating recess portion 45. A columnar portion 51 is provided at the center of the fluid outlet 33. The inner end surface 45a of the flange accommodating recess portion 45 is formed in a tapered shape which gradually decreases in diameter toward the radial inner side and inclines toward the fluid outlet 33 side.

In the outer main body portion 35, the inner member 11 is inserted from the cylindrical concave portion 47 side and the cylindrical recess portion 47 is closed by the outer bottom plate portion 37 in a state where the inner member 11 is held. Thereby, the inner member 11 is covered with the outer member 13 constituted of the outer main body portion 35 and the outer bottom plate portion 37. In a case of the shape of the inner member 11, the outer main body portion 35 may be an integral product.

The flow path 15 is formed as a gap between the outer surface of the inner member 11 and the inner surface of the outer member 13 attached to the inner member 11. The fluid inlet 31 and the fluid outlet 33 formed in the outer member 13 are communicated with the flow path 15. A fluid such as compressed air flows into the flow path 15 from the fluid inlet 31. The fluid fed from the fluid inlet 31 to the flow path 15 flows out from the fluid outlet 33 through the flow path 15. In terms of the cross-sectional area, the flow path 15 is formed in a layer shape having a substantially the same thickness in the inner member 11 excluding portions of the end surface of the protrusion portion 23 and the end surface of the flange portion 25.

In the nozzle structure described above, a processing step for processing various processes to the inner member 11 is performed by flowing a fluid through the flow path 15. This inner member 11 is manufactured by each process including the processing step described above.

In the processing step, fluid is introduced from the fluid inlet 31. The fluid flowing in from the fluid inlet 31 flows in a layered manner into the flow path 15 formed in a layer shape along the outer surface of the inner member 11 having unevenness. Specifically, the fluid flowing in from the fluid inlet 31 flows along the outer surface of the protrusion portion 23, and then flows along the outer surface of the flange portion 25 having the main body portion 21 and the cylindrical portion 27 and flows out from the fluid outlet 33. Then, the inner member 11 is processed by the fluid flowing in the laminar flow path 15 along the outer surface of the inner member 11.

According to the configuration described above, the inner end surfaces 41a and 43a of the main body accommodating recess portion 41 and the inner end surface 45a of the flange accommodating recess portion 45 are formed in a tapered shape. Therefore, the gap of the axial clearance of the flow path 15 is gradually reduced as it extends toward the radial outer side. In addition, a flow path 15 of a cylindrical shape is formed on the outer surface of the protrusion portion 23 and the outer surface of the main body portion 21. In each flow path 15, the gap of the radial clearance is smaller on the outer surface of the main body portion 21 than on the outer surface of the protrusion portion 23. That is, in a case of the flow path 15 of a cylindrical shape, the gap in the radial clearance is gradually reduced as the distance from the central axis of the cylinder increases. According to this, the cross-sectional area of the flow path 15 in the horizontal cross section in the drawing is kept constant at an arbitrary position, and thus the flow rate of the fluid in the flow path 15 becomes uniform. Therefore, the inner member 11 has a constant fluid flow rate regardless of the portion, and thus an equivalent processing effect can be obtained.

As various processes for the inner member 11 by the fluid flowing through flow path 15, for example, a removal process for removing liquid, dust, powder, or the like adhering to the outer surface of the inner member 11, a cleaning process for cleaning the outer surface of the inner member 11, a drying process for drying the outer surface of the inner member 11, a cooling process for cooling the inner member 11 with a fluid, and the like are exemplified.

For example, a gas such as air or nitrogen is used as the fluid which flows to the flow path 15 in order to perform various processes.

As described above, according to the nozzle structure and the blow device of the configuration, instead of spraying the fluid onto the outer surface of the inner member 11 to be processed, the fluid is caused to flow in the laminar flow path 15 between the inner member 11 and the outer member 13. Therefore, a continuous high-speed laminar flow with no unevenness in almost the entire area near the surface of the inner member 11 can be generated uniformly without reducing the flow rate, and thus various processes can be efficiently favorably performed with a small amount of fluid on the inner member 11. In the flow path 15, it is sufficient that the fluid becomes a laminar flow at least in a portion along the outer surface of the inner member 11, and turbulent flow may occur in other portions.

In particular, since the fluid flows through the laminar flow path 15 formed along the unevenness of the outer surface of the inner member 11, various processes using a fluid can be efficiently performed on the inner member 11 having a complicated shape having unevenness on the outer surface.

By performing various processes with respect to the inner member 11 by the nozzle structure and the blow device described above, a high-quality member made of the inner member 11 on which, for example, various processes such as a removal process for removing liquid, dust, powder, or the like adhering to the outer surface, a cleaning process for cleaning the outer surface, a drying process for drying the outer surface, and a cooling process for cooling with a fluid are satisfactorily performed can be manufactured.

Next, another embodiment will be described. The same components as those in the first embodiment are denoted by the same reference numerals and letters and description thereof will be omitted.

Second Embodiment

Figure 2:
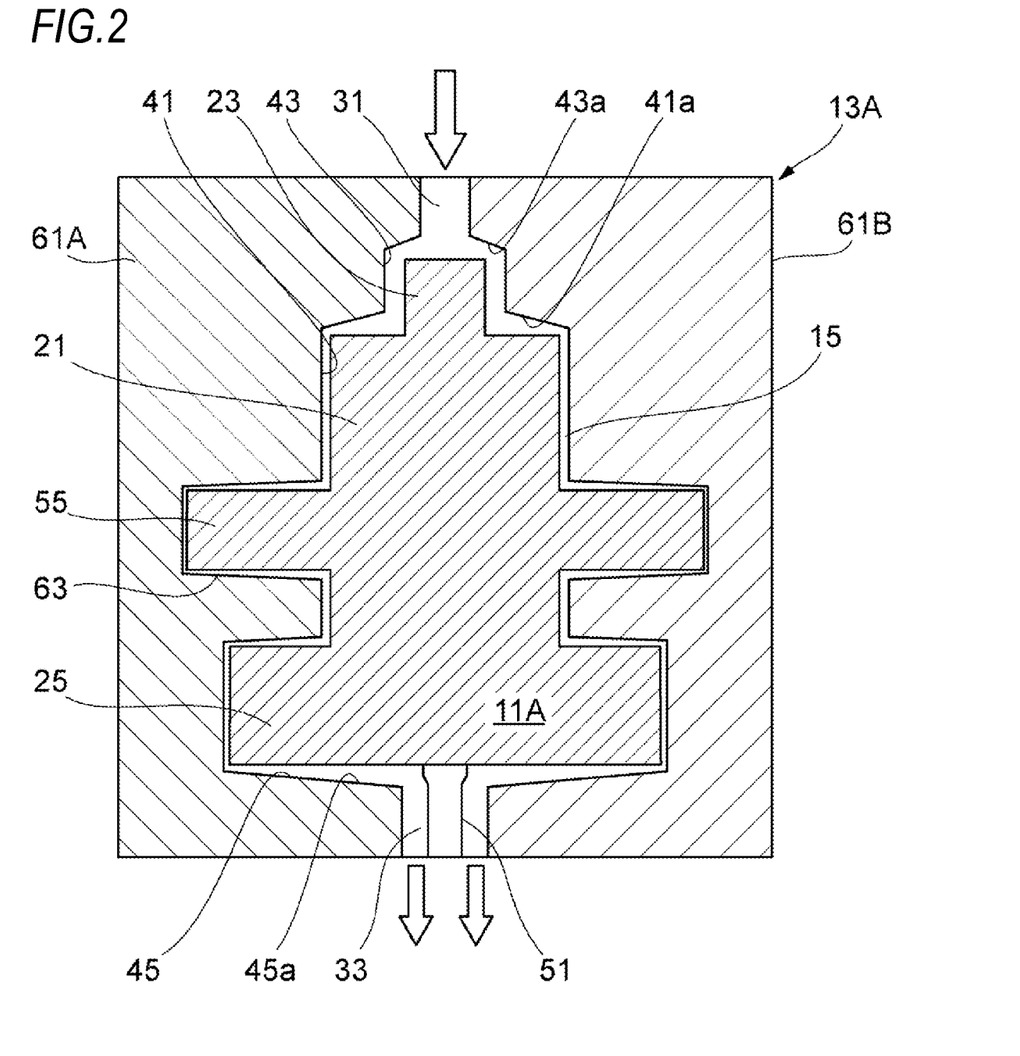
FIG. 2 is a cross-sectional view illustrating a nozzle structure according to a second embodiment.

FIG. 2 is a cross-sectional view illustrating a nozzle structure according to a second embodiment.

As illustrated in FIG. 2, in the second embodiment, an inner member 11A does not have the aforementioned cylindrical portion 27 in the flange portion 25 and a central flange portion 55 extending radially outward is formed in the central portion of the main body portion 21 in a longitudinal direction.

In the embodiment, an outer member 13A is constituted of a pair of outer divided bodies 61A and 61B divided into left and right. The outer divided bodies 61A and 61B are formed in a symmetrical shape with each other and an outer member 13A is configured by abutting one against the other. Whether the outer member 13A is constituted of an integral product or a divided structure can be selected according to the shape of the inner member and the surrounding conditions of the equipment. The same applies to the embodiments described below.

In the outer member 13A, the cylindrical recess portion 47 (see FIG. 1) in the first embodiment described above is not provided and a central flange accommodating recess portion 63 for accommodating the central flange portion 55 is formed in the main body accommodating recess portion 41 for accommodating the main body portion 21 of the inner member 11A.

The outer member 13A is attached to the inner member 11 by covering the inner member 11A with the outer divided bodies 61A and 61B from both sides thereof and abutting the outer divided bodies 61A and 61B with each other. Accordingly, the inner member 11A is covered with the outer member 13A constituted of the pair of outer divided bodies 61A and 61B.

Also, in the embodiment, in terms of the cross-sectional area, the flow path 15 is formed in a layer shape having a substantially the same thickness in the inner member 11 excluding portions of the end surface of the protrusion portion 23 and the end surface of the flange portion 25.

Also, in the processing step by the fluid in the embodiment, the fluid which flowed in from the fluid inlet 31 flows in the laminar flow path 15 along the outer surface of the inner member 11A which has unevenness. Specifically, the fluid introduced from the fluid inlet 31 flows along the outer surface of the protrusion portion 23, and then flows along the outer surfaces of the main body portion 21 having the central flange portion 55 and the flange portion 25 and flows out from the fluid outlet 33. Various processes are performed on the inner member 11A by the fluid flowing in the laminar flow path 15 along the outer surface of the inner member 11A.

In a case of the second embodiment as well, a continuous high-speed laminar flow with no unevenness in almost the entire area near the surface of the inner member 11A can be generated uniformly without reducing the flow rate, and thus various processes can be efficiently favorably performed with a small amount of fluid on the inner member 11A.

Third Embodiment

Figure 3:
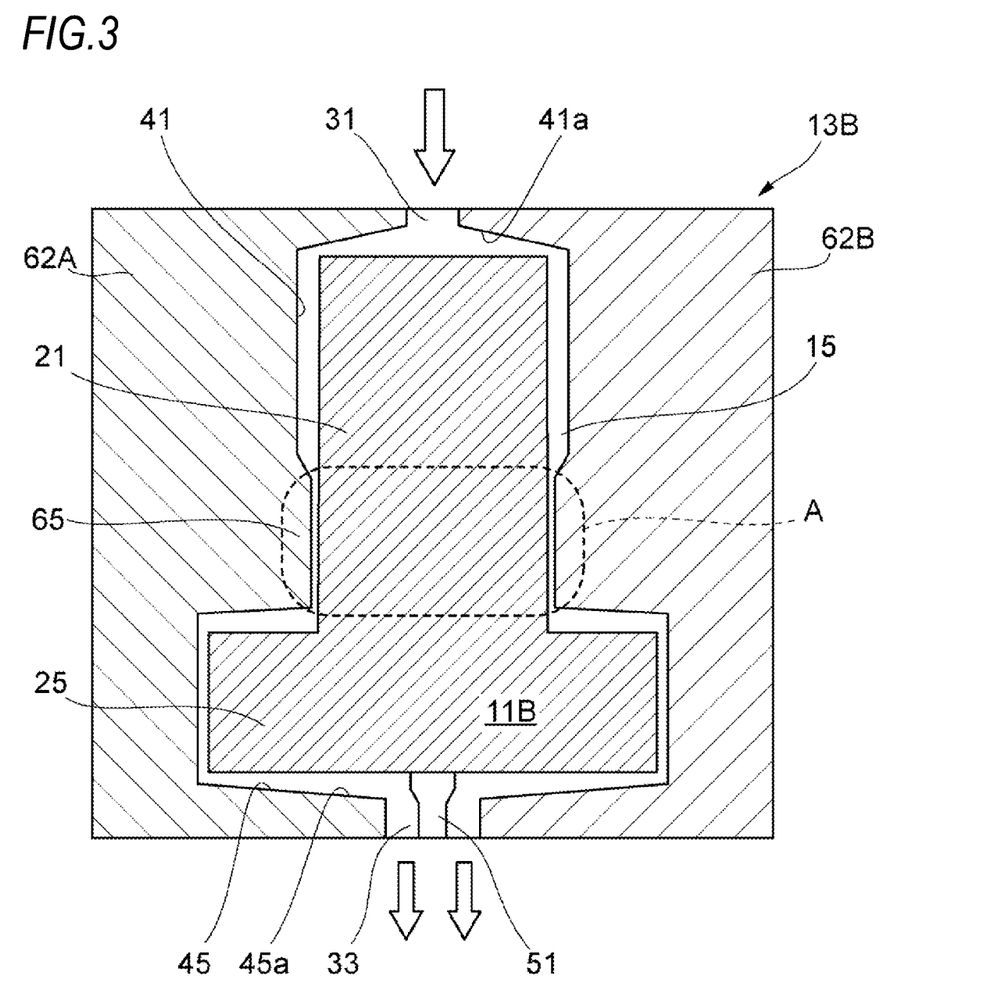
FIG. 3 is a cross-sectional view illustrating a nozzle structure according to a third embodiment.

FIG. 3 is a cross-sectional view illustrating a nozzle structure according to a third embodiment.

As illustrated in FIG. 3, in the third embodiment, an inner member 11B has a shape without the protrusion portion 23 and the cylindrical portion 27 of the flange portion 25 illustrated in FIG. 1.

Also, in the embodiment, an outer member 13B has a pair of outer divided bodies 62A and 62B divided into left and right. The outer divided bodies 62A and 62B are formed in a symmetrical shape with each other and the outer member 13B is configured by abutting one against the other.

In the outer member 13B, the protrusion accommodating recess portion 43 and the cylindrical recess portion 47 illustrated in FIG. 1 are not provided and the main body accommodating recess portion 41 has a protruding portion 65 protruding toward the main body portion 21 side of the inner member 11B.

The outer member 13B is attached to the inner member 11B by covering the inner member 11B with the outer divided bodies 62A and 62B from both sides thereof and abutting the outer divided bodies 62A and 62B with each other. Accordingly, the inner member 11B is covered with the outer member 13B constituted of the pair of outer divided bodies 62A and 62B.

In the embodiment, the cross-sectional area of the flow path 15 is changed along the direction of fluid flow. Specifically, in the flow path 15, a portion where the protruding portion 65 of the outer member 13B is formed is a narrow region A having a smaller cross-sectional area along the direction of fluid flow than other portions. In the narrow region A, the cross-sectional area is made smaller along the direction of fluid flow than in other portions.

Also, in the processing step using the fluid in the embodiment, the fluid introduced from the fluid inlet 31 flows in the laminar flow path 15 along the outer surface of the inner member 11B. Specifically, the fluid introduced from the fluid inlet 31 flows along the outer surfaces of the main body portion 21 and the flange portion 25 and flows out from the fluid outlet 33. Various processes are performed on the inner member 11B by the fluid flowing in the laminar flow path 15 along the outer surface of the inner member 11B.

In the embodiment, the flow rate of the fluid flowing through the flow path 15 is changed by changing the cross-sectional area. Specifically, the flow rate of the fluid flowing through the flow path 15 is locally increased in the narrow region A where the protruding portion 65 of the outer member 13B is formed. Thereby, in the narrow region A, the processing capability with respect to the inner member 11B by the fluid is enhanced.

Also, in a case of the embodiment, a continuous high-speed laminar flow with no unevenness in almost the entire area near the surface of the inner member 11B can be generated uniformly without reducing the flow rate, and thus various processes can be efficiently favorably performed with a small amount of fluid on the inner member 11B.

In particular, in the third embodiment, the flow rate of the fluid flowing through the flow path 15 is partially changed by changing the cross-sectional area of the flow path 15. Thereby, the change of the flow rate of the fluid can partially give strength to various processes by the fluid for the inner member 11B, and thus it is possible to satisfactorily perform uniform processing, partial concentration processing, processing on a part of complex and complicated shapes, and the like.

Fourth Embodiment

Figure 4A:
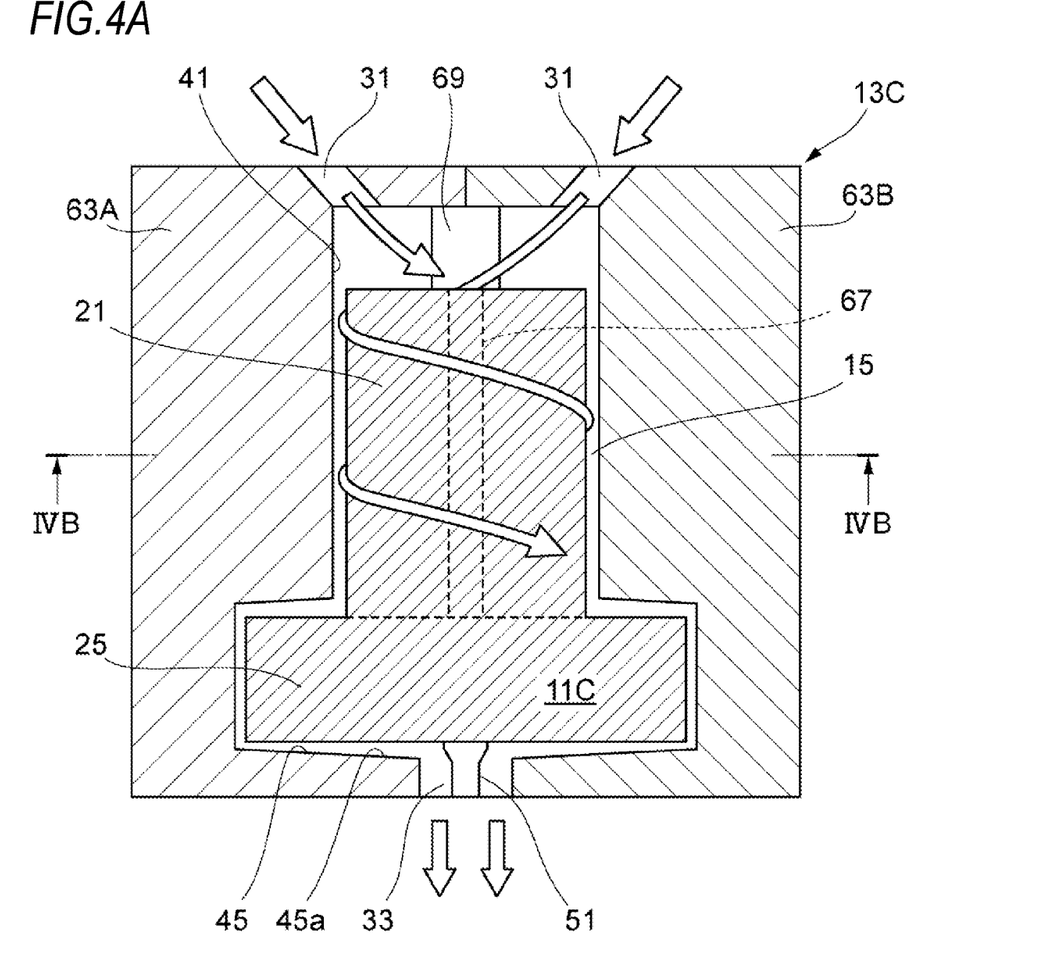
FIG. 4A is a cross-sectional view illustrating a nozzle structure according to a fourth embodiment.
Figure 4B:
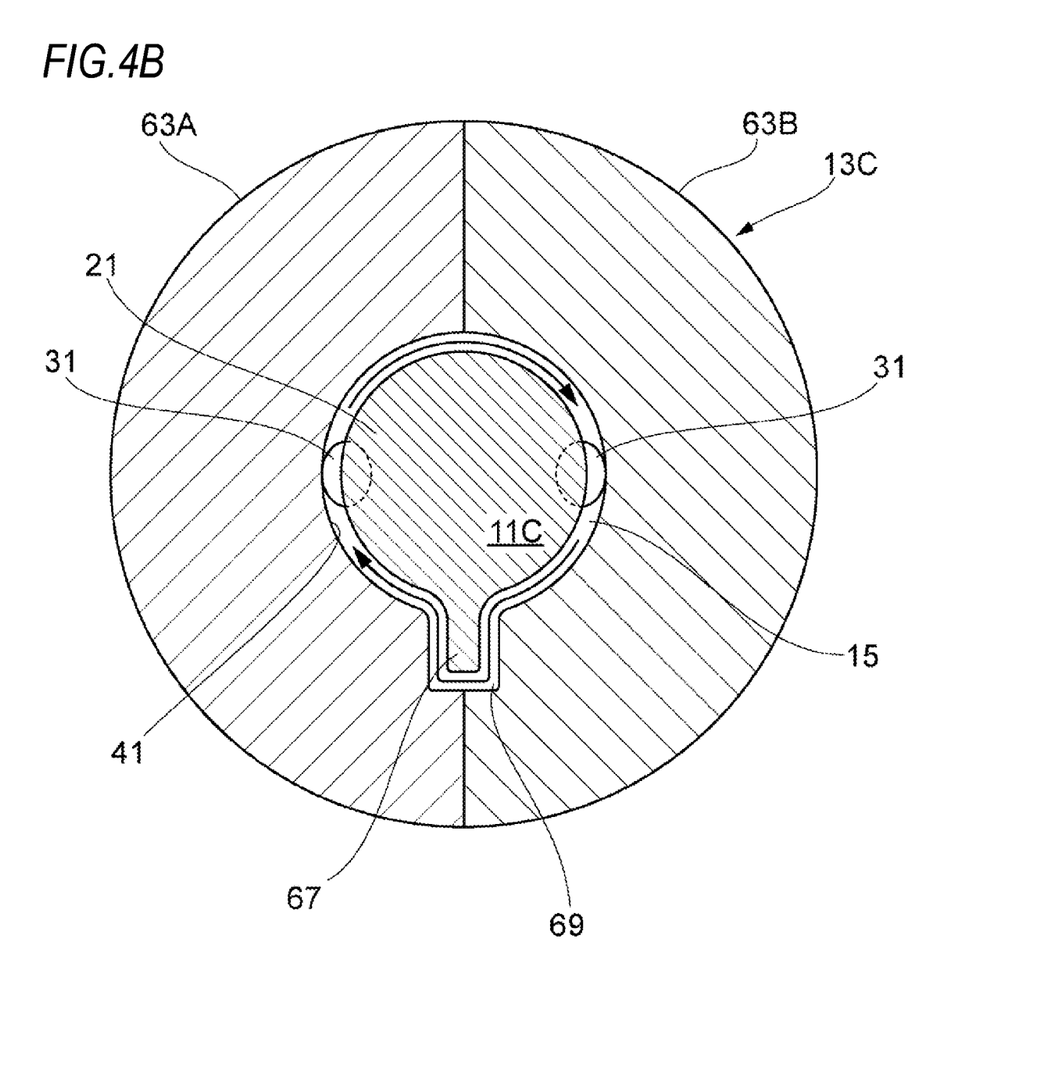
FIG. 4B is a cross-sectional view taken along the line IVB-IVB in FIG. 4A.

FIG. 4A is a cross-sectional view illustrating a nozzle structure according to a fourth embodiment and FIG. 4B is a cross-sectional view taken along the line IVB-IVB in FIG. 4A. As illustrated in FIGS. 4A and 4B, in the fourth embodiment, in an inner member 11C, the protrusion portion 23 and the cylindrical portion 27 of the flange portion 25 illustrated in FIG. 1 are not provided and a part of the peripheral surface has a protruding piece 67 along a longitudinal direction.

Also, in this embodiment, the outer member 13C has a pair of outer divided bodies 63A and 63B divided into left and right. The outer divided body 61C is formed symmetrically and the outer member 13C is configured by abutting one to the other.

In the outer member 13C, the protrusion accommodating recess portion 43 and the cylindrical recess portion 47 illustrated in FIG. 1 are not provided and a protruding piece accommodating recess portion 69 of a groove shape along the longitudinal direction is provided in the main body accommodating recess portion 41.

The outer member 13C is attached to the inner member 11C by covering the inner member 11C with the outer divided bodies 63A and 63B from both sides thereof and abutting the outer divided bodies 63A and 63B with each other. Thereby, the inner member 11C is covered with the outer member 13C constituted of the pair of outer divided bodies 63A and 63B.

In the embodiment, the outer member 13C has a plurality of fluid inlets 31. The plurality of fluid inlets 31 are formed at equal intervals in a circumferential direction. The fluid inlets 31 are inclined in the same direction along the circumferential direction and are directed to the flow path 15 between the main body portion 21 of the inner member 11C and the main body accommodating recess portion 41 of the outer member 13C.

In the processing step by the fluid in the embodiment, the fluid introduced from each fluid inlet 31 is sprayed obliquely toward the flow path 15 between the main body portion 21 of the inner member 11C and the main body accommodating recess portion 41 of the outer member 13C. Thereby, the fluid flows in the laminar flow path 15 along the outer surface of the inner member 11C. Specifically, the fluid introduced from the fluid inlet 31 flows along the outer surfaces of the main body portion 21 having the protruding piece 67 and the flange portion 25 and flows out from the fluid outlet 33. Various processes are performed on the inner member 11C by the fluid flowing in the laminar flow path 15 along the outer surface of the inner member 11C.

In this case, in the embodiment, since the fluid introduced from each fluid inlet 31 is sprayed obliquely toward the flow path 15 between the main body portion 21 of the inner member 11C and the main body accommodating recess portion 41 of the outer member 13C, a rotational force is applied to the fluid flowing through the flow path 15. As a result, the fluid flowing through the flow path 15 flows spirally along the outer surface of the inner member 11C and flows out from the fluid outlet 33.

Also, in a case of the embodiment, as described above, a continuous high-speed laminar flow with no unevenness in almost the entire area near the surface of the inner member 11C can be generated uniformly without reducing the flow rate, and thus various processes can be efficiently favorably performed with a small amount of fluid on the inner member 11C.

In particular, in the embodiment, the fluid flows spirally along the outer surface of the inner member 11C. Therefore, even when the inner member 11C has an outer surface with a non-uniform complicated shape from the inlet to the outlet of the fluid, various processes can be performed satisfactorily by flowing the fluid uniformly over the outer surface with the complicated shape.

The invention is not limited to the embodiments described above. The invention is also intended to combine the configurations of embodiments and be modified and applied by those skilled in the art based on the description of the specification and well-known techniques, and those are included in the scope for protection.

For example, when fluid is introduced from a fluid inlet formed in the outer member, the fluid may be allowed to flow while the inner member rotates. In this case, a rotation center support portion may be provided at both axial ends (upper and lower ends of the inner member illustrated in the drawing) of the inner member and a rotational force may be applied from either one (upper or lower in the drawing) of the axial directions. In this case, the fluid flow is smooth and the rotation center support portion does not hinder the fluid flow.

Various processes in the nozzle structure of the invention can be applied to machines having rotating parts such as bearings, linear guide bearings (rails, sliders), screw devices (screw shafts, nuts) such as ball screw devices, linear motion devices such as actuators (combination of linear motion guide bearings and ball screws, XY tables, and the like), steering devices such as steering columns, universal joints, intermediate gears, rack and pinions, electric power steering devices, worm reducers, and torque sensors, vehicles such as automobiles, motorcycles, and trains, and mechanical parts and electrical and electronic parts such as various manufacturing equipment.

A high-quality mechanical device can be obtained by incorporating a component constituted of the inner member 11 manufactured by performing various processes in the nozzle structure of the invention into a mechanical device (regardless of the type of power).

This application is based on Japanese patent application No. 2017-205266 filed on Oct. 24, 2017, the contents of which are incorporated herein by reference.

REFERENCE SIGNS LIST

11, 11A, 11B, 11C: inner member
13, 13A, 13B, 13C: outer member
15: flow path
31: fluid inlet
33: fluid outlet

The invention claimed is:

1. A blow device comprising
a nozzle structure including:
an outer member surrounding an inner member corresponding to a workpiece, with irregularities in an outer surface of the workpiece; and
a flow path, having a cylindrical shape, formed as a gap between the outer surface of the workpiece and an inner surface of the outer member, through which air fluid flows from a fluid inlet at one axial end of the outer member to a fluid outlet at the other end of the outer member, wherein
the inner surface of the outer member is formed to a diameter such that the cross-sectional area of the cylindrical channel in the axial vertical section of the workpiece is constant at an arbitrary axial position, and
a process on the workpiece is performed by flowing the air fluid on at least a part of the flow path along the outer surface of the workpiece.

2. A manufacturing method for parts comprising a processing step of processing the workpiece by blowing the air fluid through the blow device according to claim 1.

3. A manufacturing method for a bearing which uses the manufacturing method for parts according to claim 2.

4. A manufacturing method for a linear motion device which uses the manufacturing method for parts according to claim 2.

5. A manufacturing method for a steering device which uses the manufacturing method for parts according to claim 2.

6. A manufacturing method for a vehicle which uses the manufacturing method for parts according to claim 2.

7. A manufacturing method for a mechanical device which uses the manufacturing method for parts according to claim 2.

8. The blow device according to claim 1, wherein the workpiece has a body part formed in a cylindrical shape and a flange part provided in the body part and projecting radially outward from the body part, the flange part being on the fluid outlet side of the body part.

9. The blow device according to claim 8, wherein a annular cylindrical part extending axially along the workpiece, toward the one axial end of the workpiece, is formed at an outer edge of the flange part.

10. The blow device according to claim 1, wherein the air fluid flowing through the flow path is spirally flown along the outer surface of the workpiece.

11. The blow device according to claim 1, wherein the flow path is narrower in a radial direction toward an outer peripheral side of the workpiece.

12. The blow device according to claim 1, wherein the outer member has a divided structure having a plurality of divided bodies.

13. The blow device according to claim 1, wherein the gap of the flow path is gradually reduced in a radial direction toward an outer peripheral side of the workpiece.

14. The blow device according to claim 1, wherein the workpiece has a main body part formed in a cylindrical shape and a protrusion part formed in a cylindrical shape and extending from the main body part toward the fluid inlet.

15. The blow device according to claim 14, wherein the outer member has a protrusion accommodating recess portion for accommodating the protrusion part of the workpiece, the protrusion accommodating recess portion being defined by first and second tapered wall surfaces and a cylindrical wall surface axially disposed between the first and second tapered surfaces such that the gap of the flow path is gradually reduced in a radial direction toward an outer peripheral side of the workpiece.

16. A blow device comprising:
a nozzle structure including:
an outer member surrounding an inner member corresponding to a workpiece, with irregularities in an outer surface of the workpiece; and
a flow path, having a cylindrical shape, formed as a gap between the outer surface of the workpiece and an inner surface of the outer member, through which fluid flows from a fluid inlet at one axial end of the outer member to a fluid outlet at the other end of the outer member, wherein
the inner surface of the outer member is formed to a diameter such that the cross-sectional area of the cylindrical channel in the axial vertical section of the workpiece is constant at an arbitrary axial position,
a process on the workpiece is performed by flowing the fluid on at least a part of the flow path along the outer surface of the workpiece, and
the outer member has a protrusion accommodating recess portion for accommodating the protrusion part of the workpiece, the protrusion accommodating recess portion being defined by first and second tapered wall surfaces and a cylindrical wall surface axially disposed between the first and second tapered surfaces such that the gap of the flow path is gradually reduced in a radial direction toward an outer peripheral side of the workpiece.

* * * * *